(12) United States Patent
Torii et al.

(10) Patent No.: US 6,390,264 B2
(45) Date of Patent: May 21, 2002

(54) CLUTCH AND MOTOR INCLUDING SUCH CLUTCH

(75) Inventors: Katsuhiko Torii, Hamamatsu; Hiroaki Yamamoto; Tadashi Adachi, both of Kosai, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/768,049

(22) Filed: Jan. 24, 2001

(30) Foreign Application Priority Data

Feb. 2, 2000 (JP) ........................................ 2000-025196

(51) Int. Cl.[7] .............................. F16D 41/06; F16H 1/16
(52) U.S. Cl. ......................... 192/38; 192/223.2; 310/78
(58) Field of Search ........................ 192/38, 37, 223.2, 192/44, 45, 27, 69.5, 46, 69; 310/78, 75 ALL, 77; 74/425

(56) References Cited

U.S. PATENT DOCUMENTS 6,229,233 B1 * 5/2001 Torii et al. .................... 310/78
6,288,464 B1 * 9/2001 Torii et al. ................ 192/223.2

FOREIGN PATENT DOCUMENTS

WO 0008349 * 2/2000

* cited by examiner

*Primary Examiner*—Douglas C. Butler
(74) *Attorney, Agent, or Firm*—Law Offices of David G. Posz

(57) ABSTRACT

In a clutch, when a driving-side rotator is rotated, the driving-side rotator engages a driven-side rotator in a rotational direction and transmits a rotational force of the driving-side rotator to the driven-side rotator. When the driven-side rotator is rotated by an external force, a rolling element is clamped between the driven-side rotator and an inner circumferential surface of a housing. At the same time the driven-side rotator is allowed to rotate while generating a desired frictional force between the rolling element and the inner circumferential surface of the housing, so that the rotation of the driven-side rotator is not transmitted to the driving-side rotator.

12 Claims, 9 Drawing Sheets

CLUTCH AND MOTOR INCLUDING SUCH CLUTCH

CROSS REFERENCE TO RELATED APPLICATION

This application is based on and incorporates herein by reference Japanese Patent Applications No. 2000-25196 filed on Feb. 2, 2000 and No. 2000-344894 filed on Nov. 13, 2000.

BACKGROUND OF THE INVENTION

The present invention relates to a clutch that allows rotation of a driven-side rotator while making the driven-side rotator difficult to rotate and also to a motor having such a clutch.

A motor of a power window system has a motor main body and an output unit. The output unit transmits rotation of a rotatable shaft of the motor main body to a regulator (located on a driven side) via a worm shaft to reduce a rotational speed of the rotatable shaft before it is transmitted to the regulator. The worm shaft is formed integrally with the rotatable shaft or is arranged coaxial with the rotatable shaft. When the motor is driven, the rotation of the rotatable shaft is transmitted to the output unit via the worm shaft. After the output unit reduces the rotational speed of the rotatable shaft, the regulator converts the rotational movement to reciprocal movement. As a result, a window glass is moved up and down by the regulator to close and open the window glass, respectively.

In this type of power window system, when the motor is not driven, a downward load applied to the window glass is converted to a rotational force by the regulator and is transmitted to the rotatable shaft of the motor main body to rotate the same. This transmission of the rotation causes forceful downward movement of the window glass to open the same when an external force is applied to the window glass, causing likelihood of burglarization.

In order to prevent such transmission of the rotation, a motor having a clutch that prevents the transmission of the rotation from a driven-side rotator to a driving-side rotator has been proposed. In this motor, the clutch transmits the rotation of the driving-side rotator to the driven-side rotator but does not transmit the rotation of the driven-side rotator to the driving-side rotator.

It would be easier and better if the clutch is designed such that the transmission of the rotation from the driven-side rotator to the driving-side rotator is prevented by the entire motor or by the entire power window system in consideration of loss of the rotational force at each sliding portion within it. However, the above prior art prevents the transmission of the rotational force from the driven-side rotator to the driving-side rotator only by the clutch itself. Thus, in order to completely prevent the transmission of the rotational force from the driven-side rotator to the driving-side rotator only by the clutch, each component of the clutch must be manufactured with a high degree of accuracy, resulting in the higher costs. As a result, there is a need for an inexpensive clutch that makes the rotation of the driven-side rotator difficult instead of completely preventing the transmission of the rotational force from the driven-side rotator to the driving-side rotator.

This fact is not only in the clutch used in the power window system but is also equally in any other devices that require a clutch and also require the rotation of the driven-side rotator to be allowed while making the rotation of the driven-side rotator difficult.

SUMMARY OF THE INVENTION

It is therefore an objective of the present invention to provide a clutch that transmits rotation of a driving-side rotator driven by a drive source to a driven-side rotator and that allows the rotation of the driven-side rotator while making the driven-side rotator difficult to rotate when the driven-side rotator is rotated by a load applied to it.

It is another objective of the present invention to provide a motor having such a clutch.

To achieve the above objectives, there is provided a clutch including a housing, a driving-side rotator, a driven-side rotator and a clampable element. The housing is non-rotatably secured and has an inner circumferential surface. The driving-side rotator is connected to a drive source and is rotatably received within the housing. The driven-side rotator is connected to a load and is rotatably received within the housing. Furthermore, the driven-side rotator is connected to the driving-side rotator in a manner allowing relative rotation of the driven-side rotator within a predetermined range in a rotational direction. The clampable element is arranged between the driven-side rotator and the inner circumferential surface of the housing and is positionable between a clamped position where the clampable element is clamped between the driven-side rotator and the inner circumferential surface of the housing and a non-clamped position where the clampable element is not clamped between the driven-side rotator and the inner circumferential surface of the housing.

When the driving-side rotator is rotated, rotation of the driving-side rotator causes the clampable element to be positioned in the non-clamped position and also to be revolved therewith. At the same time, the driving-side rotator engages the driven-side rotator in a rotational direction and transmits a rotational force of the driving-side rotator to the driven-side rotator. When the driven-side rotator is rotated, the clampable element is positioned in the clamped position, and at the same time the driven-side rotator is allowed to rotate while generating a desired frictional force between the clampable element and the inner circumferential surface of the housing.

Furthermore, there is also provided a motor having the above clutch.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

One embodiment of the present invention will be described with reference to a power window system shown in FIGS. 1–12.

Figure 12:
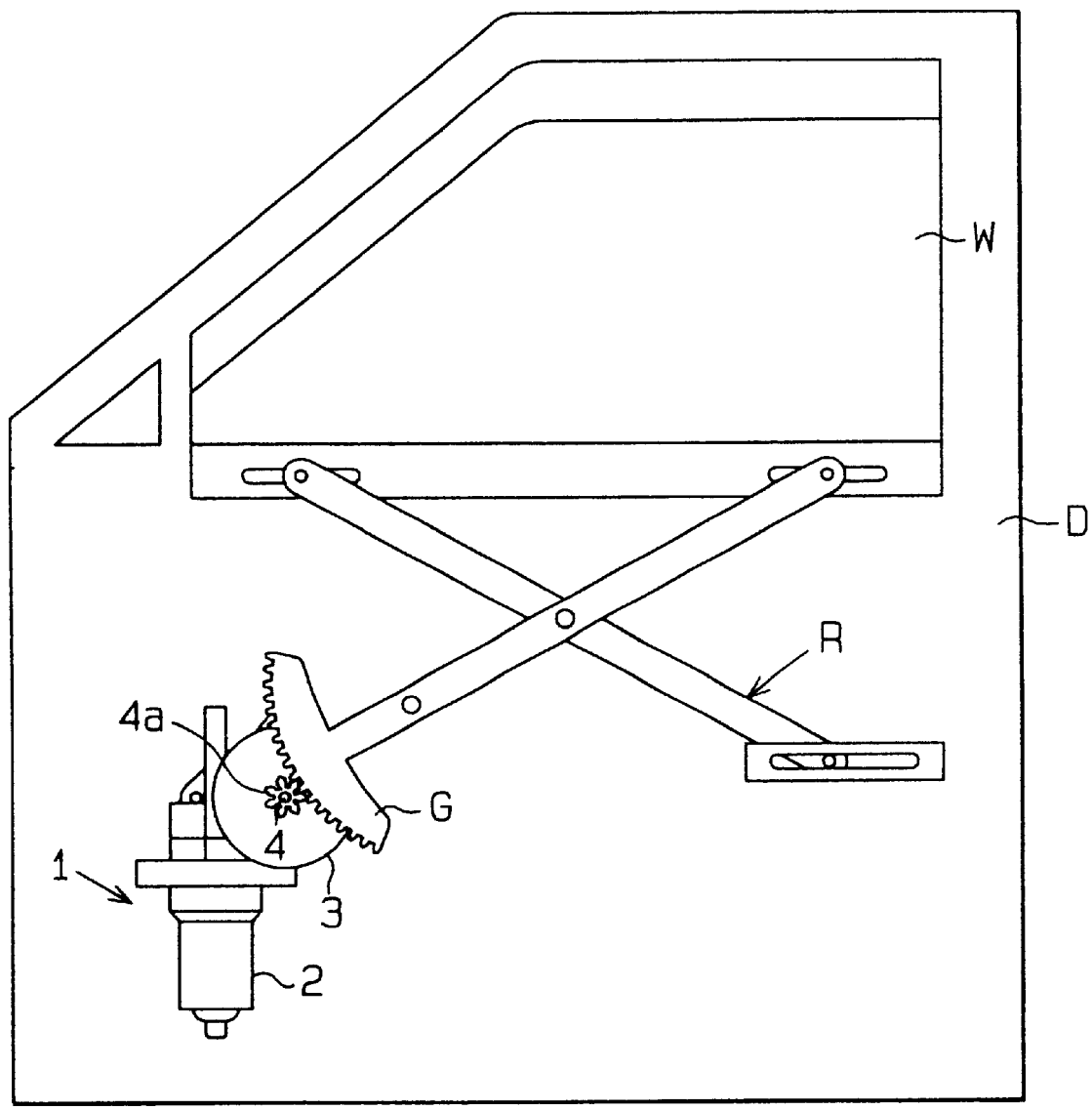
FIG. 12 is a schematic side view of a power window system according to the embodiment.

As shown in FIG. 12, a motor 1 of the power window system is secured to a vehicle door D. The motor 1 has a motor main body 2 and an output unit 3. The motor main body 2 rotates a gear 4a secured to an output shaft 4 of the output unit 3 in a forward or backward rotational direction. The gear 4a meshes with a gear G provided on a window regulator R of an X-arm type. Thus, when the gear 4a is rotated forward or backward, the window regulator R moves a window glass W up or down, respectively.

Figure 1:
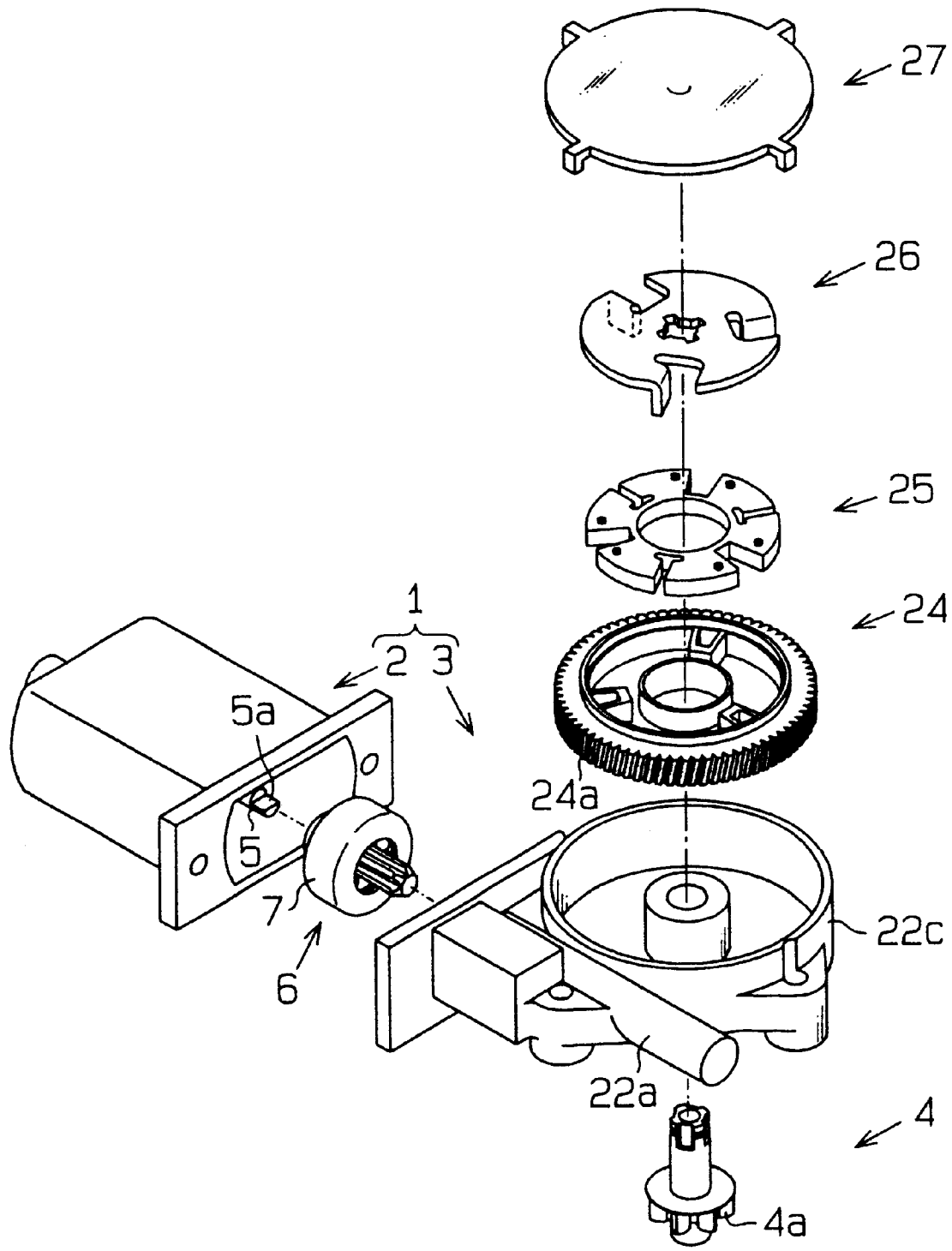
FIG. 1 is an exploded perspective view of a motor according to an embodiment of the present invention.

As shown in FIG. 1, a coupling portion 5a having a generally D-shaped cross section is formed on a distal end of a rotatable shaft 5 of the motor main body 2. At the distal end of the motor main body 2 (rotatable shaft 5), a clutch 6 is provided.

Figure 3:
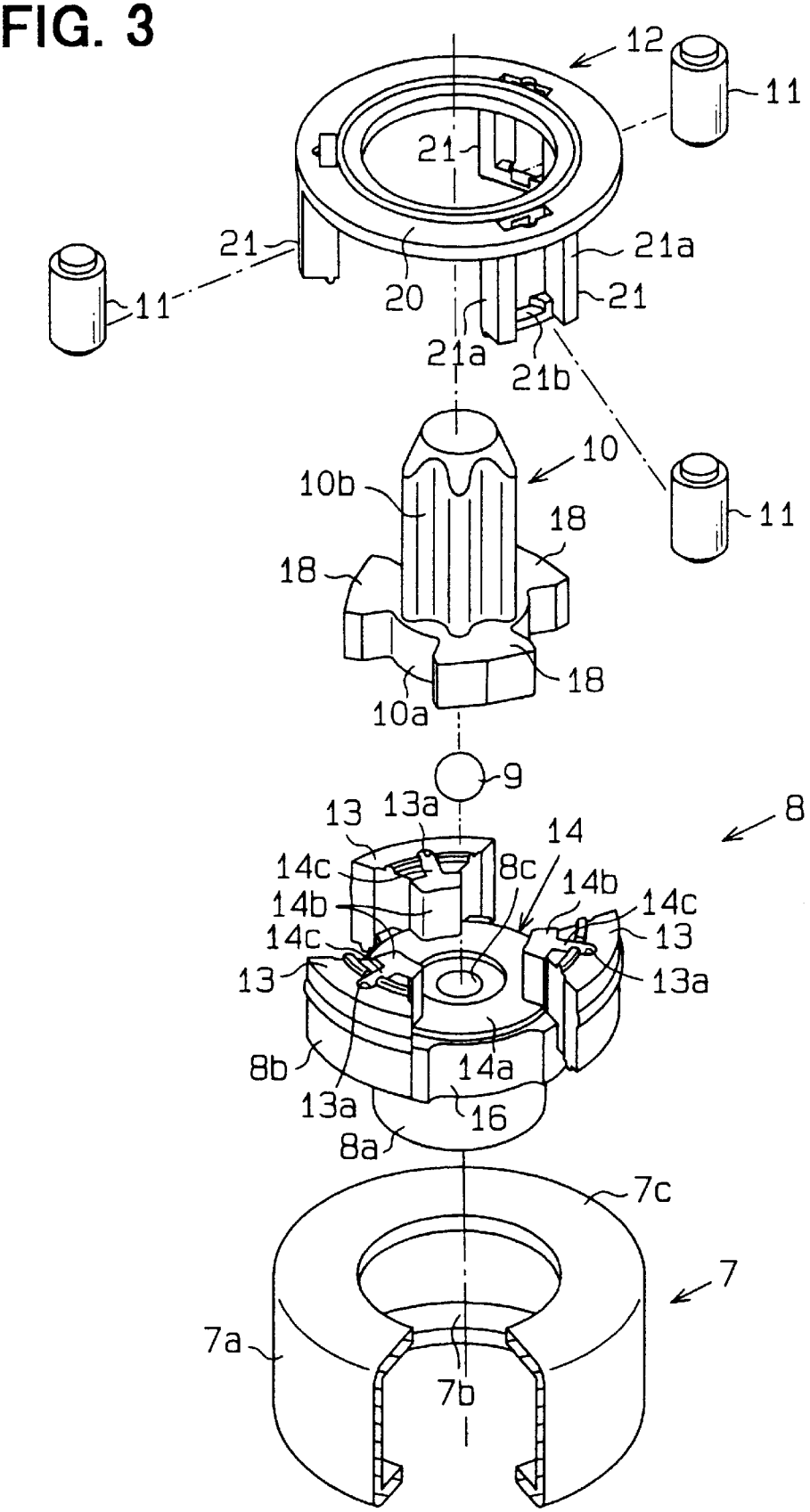
FIG. 3 is an exploded perspective view of a clutch according the embodiment.
Figure 4:
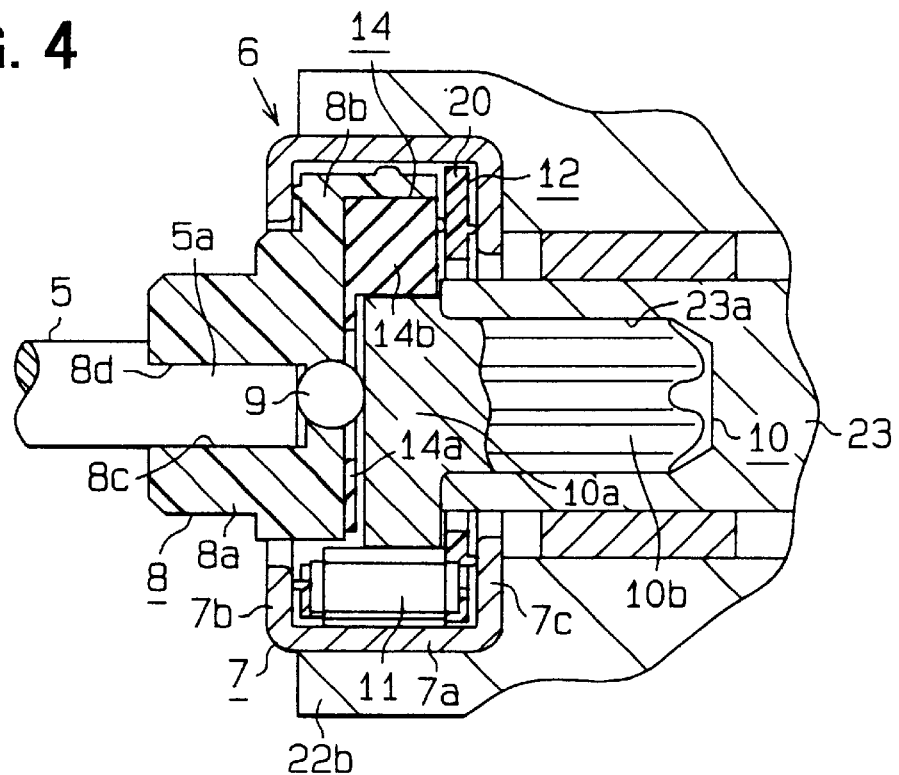
FIG. 4 is a schematic partial longitudinal cross-sectional view of the clutch according to the embodiment.

As shown in FIGS. 3 and 4, the clutch 6 includes a clutch housing 7, a driving-side rotator 8, a ball 9, a driven-side rotator 10, three rolling elements 11 acting as clampable elements and a support member 12. The clutch housing 7 includes ha cylindrical outer ring 7a and annular covers 7b, 7c that extend radially inward from opposing circumferential edges of the outer ring 7a, respectively. The driving-side rotator 8, the ball 9, the driven-side rotator 10, the rolling elements 11 and the support member 12 are housed within the clutch housing 7 to constitute one functional unit (clutch 6).

The driving-side rotator 8 is made of resin material and includes a shaft 8a and a disk body 8b having a diameter larger than that of the shaft 8a. A base side (the left side of FIG. 4) of disk body 8b of the driving-side rotator 8 slides and rotates along an inner wall surface of the annular cover 7b of the clutch housing 7. A shaft center hole 8c extends through the driving-side rotator 8 along the rotational axis thereof. A coupling hole 8d having a generally D-shaped cross section is formed at a base side (the left side of FIG. 4) of the shaft center hole 8c. As shown in FIG. 4, the coupling hole 8d is exposed to the exterior of the clutch housing 7 and is securely coupled with the coupling portion 5a of the rotatable shaft 5. Thus, when the rotatable shaft 5 of the motor main body 2 is rotated, the rotational force of the rotatable shaft 5 is transmitted to the driving-side rotator 8.

Furthermore, as shown in FIG. 3, a plurality (three in this instance) of generally fan-shaped protrusions 13 are arranged at the distal side (the right side of FIG. 4) of the disk body 8b. The protrusions 13 are circumferentially spaced at equal angular intervals and extend in an axial direction of the driving-side rotator 8. In each protrusion 13, a coupling groove 13a extends halfway from an inner circumferential surface of each protrusion 13 in a radially outward direction.

A cushion member 14 made of rubber material is securely coupled to the coupling groove 13a of each protrusion 13. More particularly, as shown in FIG. 3, the cushion member 14 includes a relatively thin ring 14a and a plurality (three in this instance) of cushion segments 14b. The cushion segments 14b are spaced at equal angular intervals around an outer circumference of the ring 14a and extend in an axial direction. Each cushion segment 14b has a coupling projection 14c for engaging with the coupling groove 13a on its outer circumferential side. Each coupling projection 14c is coupled with the corresponding coupling groove 13a, and the ring 14a is secured to the disk body 8b.

Figure 5:
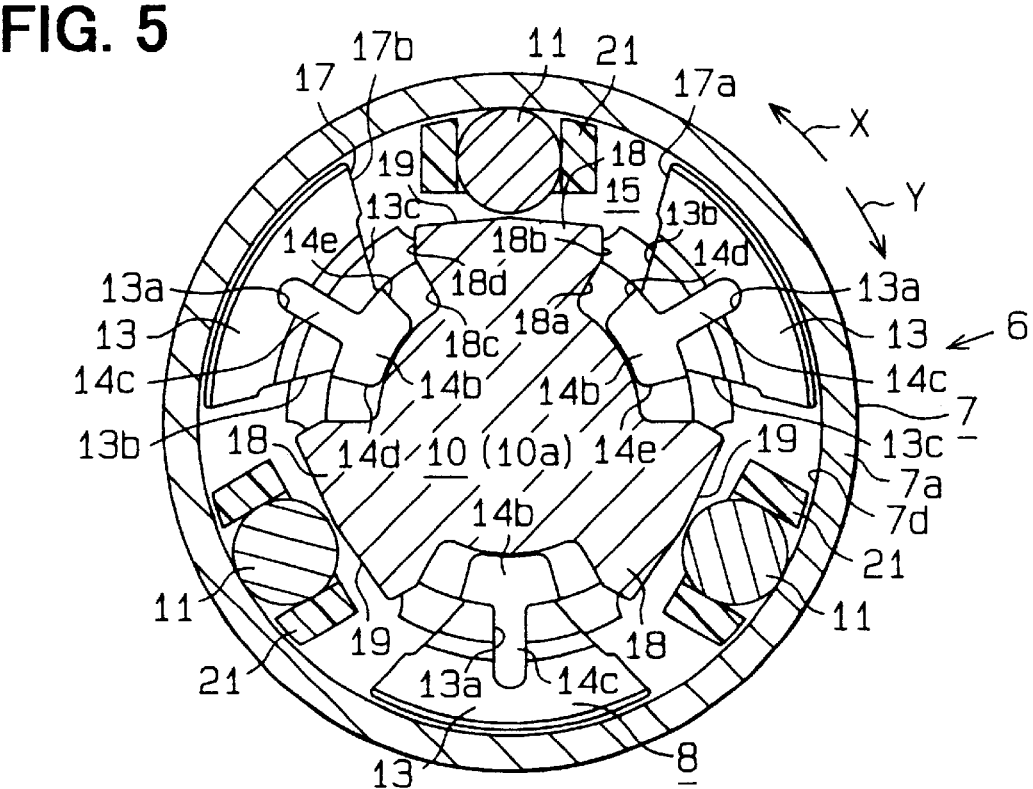
FIG. 5 is a schematic cross-sectional view of the clutch according to the embodiment.

As shown in FIG. 5, a circumferential width of each cushion segment 14b is slightly longer than a circumferential width of an inner circumferential surface of the corresponding protrusion 13. A plurality (three in this instance) of engaging slots 15 are formed at equal angular intervals. Each engaging slot 15 is defined between one side surface (circumferential side surface) 13b of one protrusion 13 and an opposing side surface 13c of the next protrusion 13 and also between one side surface 14d (circumferential side surface) of one cushion segment 14b and an opposing side surface 14e of the next cushion segment 14b. These engaging slots 15 are communicated with each other at center side. Recesses 16 that extend in an axial direction are formed at the outer circumference of the disk body 8b where the protrusion 13 is not present. The side surfaces 13b, 13c of the protrusions 13 are slightly bulged in the circumferential direction at their outer circumferential sides to define an opening 17 of each engaging slot 15.

The ball 9 is a spherical metal having an outer diameter corresponding to an inner diameter of the shaft center hole 8c and is received in the shaft center hole 8c from a distal end opening (the right side of FIG. 4) of the shaft center hole 8c. While the ball 9 is received in the shaft center hole 8c, part of the ball 9 protrudes from the shaft center hole 8c.

The driven-side rotator 10 has a disk body 10a and a coupling body 10b that protrudes from the center of the disk body 10a toward its distal end (the right side of FIG. 4). The disk body 10a abuts the ball 9 at its base side (the left side of FIG. 4) and is surrounded by the protrusions 13 (cushion segments 14b) in a manner that allows rotation of the disk body 10a. Furthermore, since the disk body 10a makes point contact with the ball 9, the disk body 10a can rotate smoothly.

As shown in FIGS. 3 and 5, the disk body 10a has a plurality (three in this instance) of generally fan-shaped engaging projections 18. The engaging projections 18 extend radially outward and are spaced at equal angular intervals. A circumferential width of each engaging protrusion 18 is smaller than that of the corresponding engaging slot 15. The engaging protrusion 18 is received in the corresponding engaging slot 15.

Figure 8:
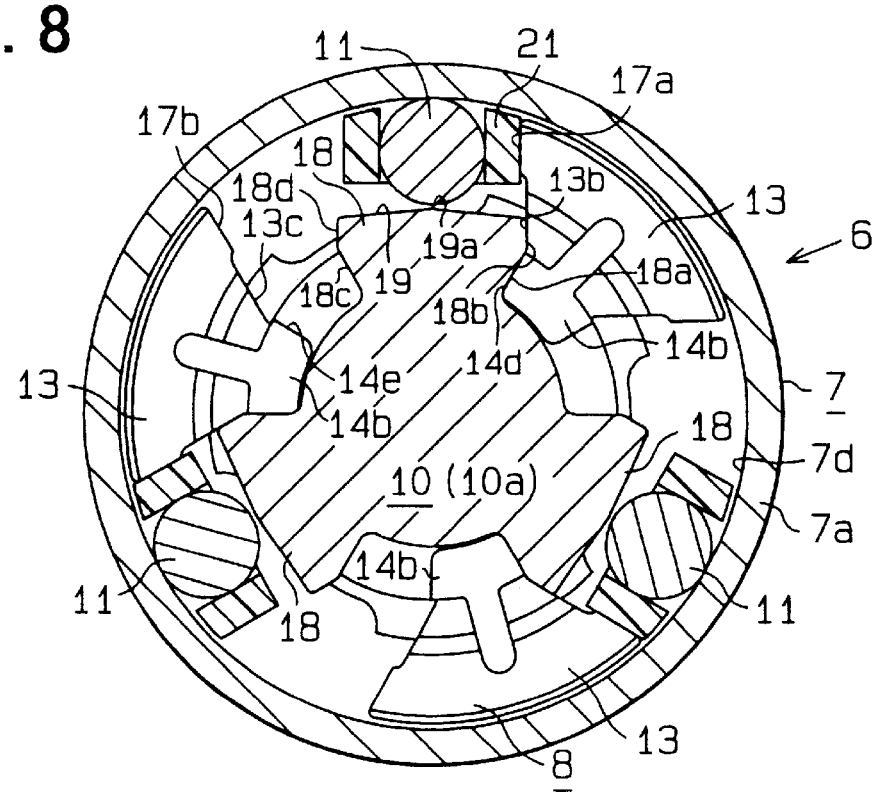
FIG. 8 is a schematic cross-sectional view of the clutch according to the embodiment.

As shown in FIG. 5, a first cushion surface 18a opposing one side surface (counter-clockwise side surface) 14d of the corresponding cushion segment 14b is formed at a radially inward region of a clockwise side surface of each engaging projection 18. Furthermore, a first engaging surface 18b opposing one side surface (counter-clockwise side surface) 13b of the corresponding protrusion 13 is formed at a radially outward region of the clockwise side surface of the engaging projection 18. The first cushion surface 18a engages the one side surface 14d of the cushion segment 14b when the driving-side rotator 8 is rotated to a predetermined position in the counter-clockwise direction (the direction of an arrow X) relative to the driven-side rotator 10. Furthermore, the first engaging surface 18b engages the one side surface 13b of the protrusion 13 when the driving-side rotator 8 is rotated beyond the predetermined position in the counter-clockwise direction (the direction of the arrow X). Since the cushion segment 14b is deformed in the circumferential direction, the driving-side rotator 8 is allowed to rotate beyond the predetermined position in the counter-clockwise direction (the direction of the arrow X), as shown in FIG. 8.

Figure 9:
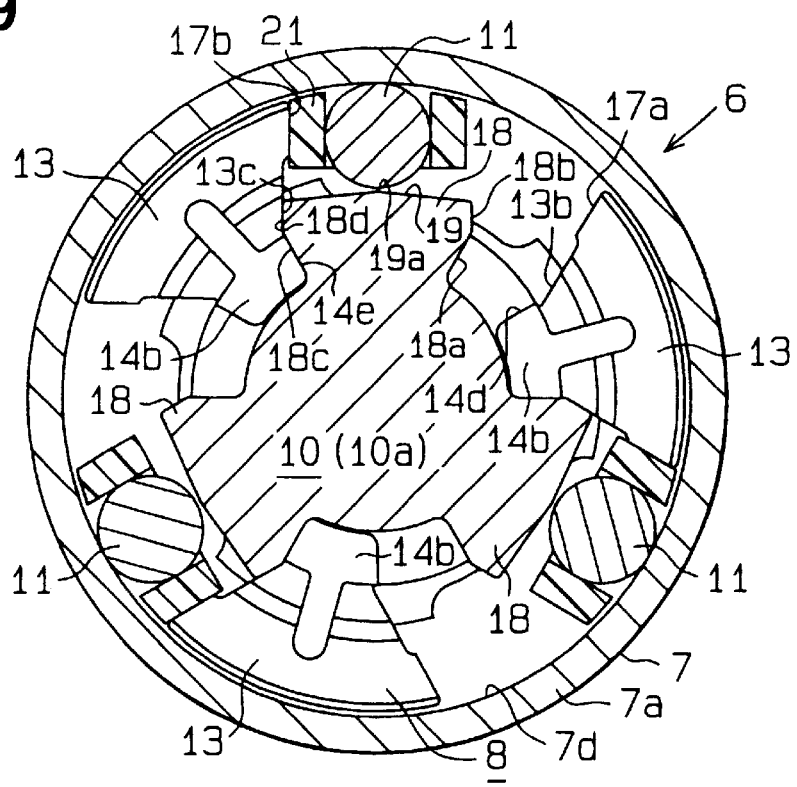
FIG. 9 is another schematic cross-sectional view of the clutch according to the present embodiment.

A second cushion surface 18c opposing the other side surface (clockwise side surface) 14e of the corresponding cushion segment 14b is formed at a radially inward region of a counter-clockwise side surface of each engaging projection 18. Furthermore, a second engaging surface 18d opposing the other side surface (clockwise side surface) 13c of the corresponding protrusion 13 is formed at a radially outward region of the counter-clockwise side surface of the engaging projection 18. The second cushion surface 18c engages the other side surface 14e of the cushion segment 14b when the driving-side rotator 8 is rotated to a predetermined position in the clockwise direction (the direction of an arrow Y) relative to the driven-side rotator 10. Furthermore, the second engaging surface 18d engages the other side surface 13c of the protrusion 13 when the driving-side rotator 8 is rotated beyond the predetermined position in the clockwise direction (the direction of the arrow Y). Since the cushion segment 14b is deformed in the circumferential direction, the driving-side rotator 8 is allowed to rotate beyond the predetermined position in the clockwise direction (the direction of the arrow Y), as shown in FIG. 9.

Figure 6:
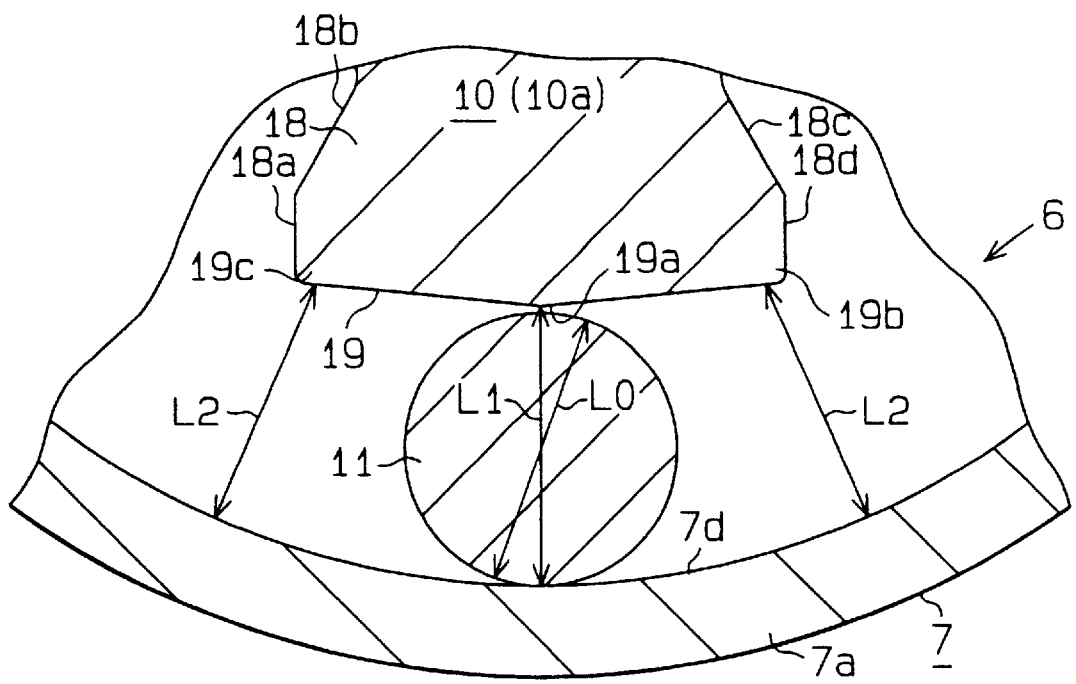
FIG. 6 is a partial schematic cross-sectional view of the clutch according to the embodiment.
Figure 7:
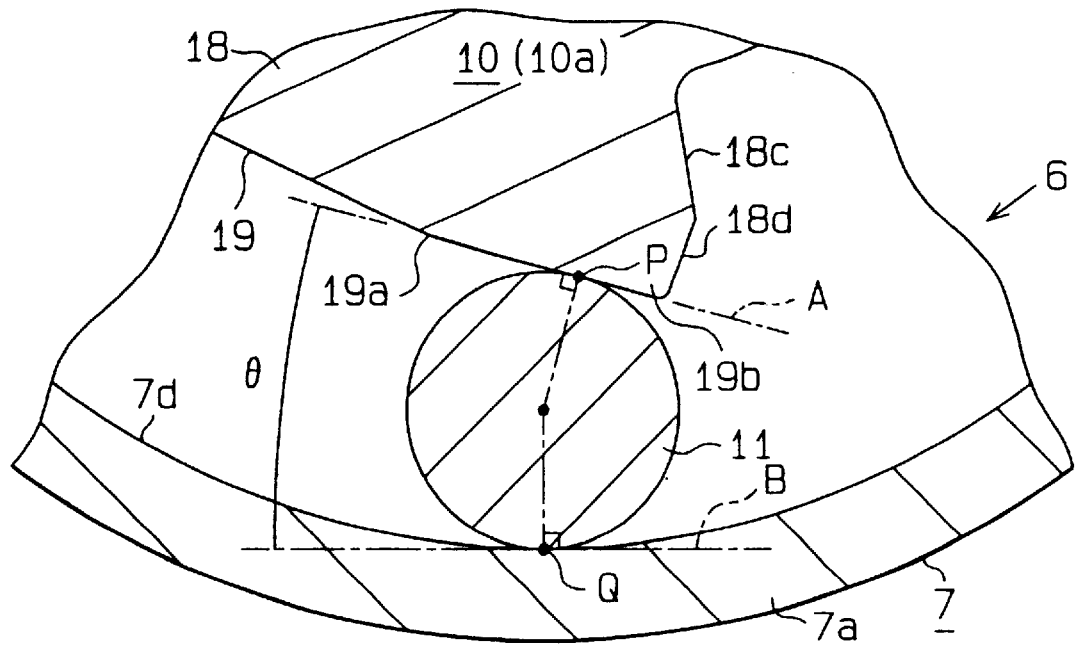
FIG. 7 is a partial schematic cross-sectional view of the clutch according to the embodiment.

A control surface 19 is formed on an outer circumferential surface of each engaging projection 18. As shown in FIG. 6, in the control surface 19, opposing circumferential end portions 19b, 19c are located radially outward of a center portion 19a. The control surface 19 forms a substantially straight line between the center portion 19a and each of the end portions 19b, 19c. That is, a distance between the control surface 19 and the inner circumferential surface 7d of the outer ring 7a decreases from the center portion 19a (a distance L1) toward the respective end portions 19b, 19c (a distance L2).

Each rolling element 11 is a generally cylindrical body made of metal material. The rolling element 11 is circumferentially positioned between a first side surface 17a and a second side surface 17b of the opening 17 and is radially positioned between the control surface 19 of the engaging projection 18 and an inner circumferential surface 7d of the outer ring 7a of the clutch housing 7. As shown in FIG. 6, a diameter L0 of the rolling element 11 is smaller than the distance L1 between the center portion 19a of the control surface 19 and the inner circumferential surface 7d of the outer ring 7a. It is however larger than the distance L2 between each of the end portions 19b, 19c of the control surface 19 and the inner circumferential surface 7d of the outer ring 7a.

Figure 10:
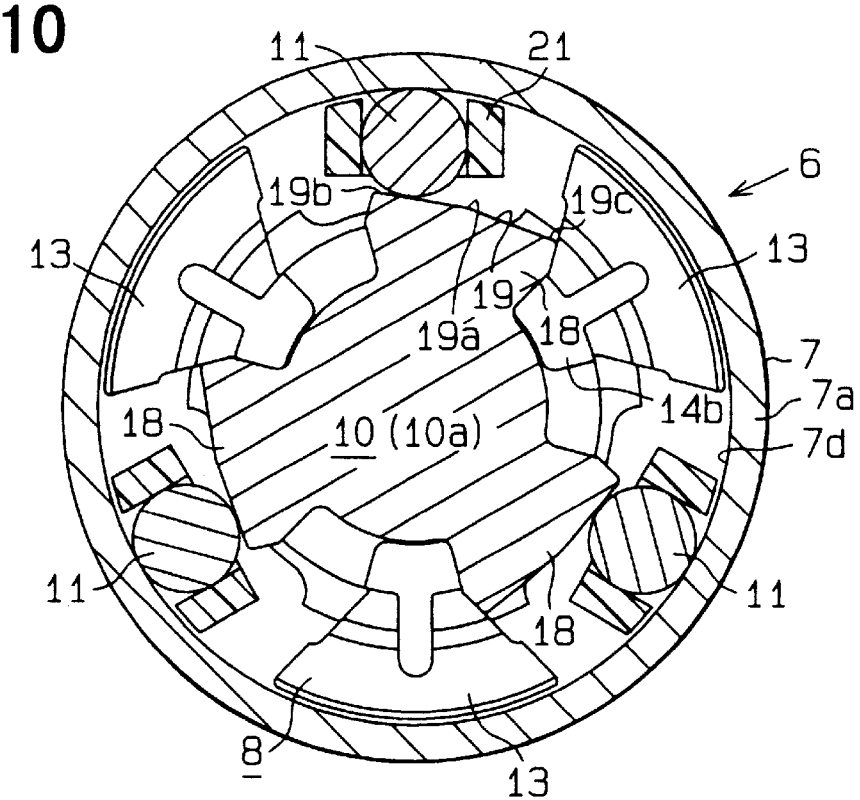
FIG. 10 is another schematic cross-sectional view of the clutch according to the present embodiment.

For instance, when the driven-side rotator 10 is rotated in the clockwise direction (the direction of the arrow Y) of FIG. 5 by the clutch 6 alone, the rolling element 11 is clamped between the control surface 19 and the inner circumferential surface 7d of the outer ring 7a, as shown in FIG. 10. This is more clearly shown by enlargement in FIG. 7. In this embodiment, the control surface 19 is formed such that when the rotational force is further applied to the driven-side rotator 10 in the same direction, the rolling element 11 is revolved along with the driven-side rotator 10 while the rolling element 11 making sliding engagement with the inner circumferential surface 7d of the outer ring 7a and generating a desired frictional force therebetween.

More specifically, in the present embodiment, an angle θ between a tangent line A at a contact point P between the control surface 19 and the rolling element 11 and a tangent line B at a contact point Q between the rolling element 11 and the inner circumferential surface 7d of the outer ring 7a is "15 degrees". Various angles θ were studied and tested to find the most appropriate angle. As a result, when θ=15 degrees, the most desirable frictional force (in this instance, a coefficient θ of friction of the control surface 19 is "0.05 to 0.3") can be provided. According to this study, when the angle θ is between 5 to 20 degrees, a desirable frictional force can be generated. Furthermore, when the angle θ is between 10 to 20 degrees, a further desirable frictional force can be generated.

Because of the frictional force, the driving-side rotator 8 cannot be easily rotated by the driven-side rotator 10. Furthermore, the motor 1 having the above type of clutch 6 is arranged such that the rotation of the output shaft 4 of the motor 1 is prevented since the driving force to rotate the output shaft 4 is lost before it is transmitted to the output shaft 4, for example, at the clutch 6, the respective sliding parts (e.g., meshed gear portions or bearing portions) or the like.

The support member 12 is made of resin material and includes a ring plate 20 and three roller supports 21. The ring plate 20 is slidably received between the cover 7c of the clutch housing 7 and the protrusions 13 of the driving-side rotator 8. Each roller support 21 extends in the axial direction from the ring plate 20 to rotatably support the corresponding rolling element 11 in parallel with a rotational axis thereof. The roller supports 21 are arranged at equal angular intervals on the ring plate 20.

Each roller support 21 includes a couple of retaining pillars 21a and a connector 21b. The retaining pillars 21a extend in the axial direction from the ring plate 20, and the connector 21b connects distal ends of the retaining pillars 21a together. In the roller support 21, a distance between the retaining pillars 21a is slightly longer than a diameter of the rolling element 11, and a distance between the ring plate 20 and the connector 21b is slightly longer than an axial length of the rolling element 11. The rolling element 11 is rotatably supported between the two retaining pillars 21a and also between the ring plate 20 and the connector 21b. Furthermore, the rolling element 11 is immovable in the circumferential direction of the ring plate 20 but is movable in the radial direction of the ring plate 20.

In this embodiment, the components 11, 13, 18 and 21 are geometrically arranged such that, as shown in FIG. 8, when the one side surface 13b of each protrusion 13 engages the first engaging surface 18b of the corresponding engaging projection 18, and the first side surface 17a of each opening 17 engages the corresponding roller support 21, the corresponding rolling element 11 is positioned in the center portion 19a of the control surface 19.

Furthermore, as shown in FIG. 9, the components 11, 13, 18 and 21 are further geometrically arranged such that when the other side surface 13c of each protrusion 13 engages the second engaging surface 18d of the corresponding engaging projection 18, and the second side surface 17b of each opening 17 engages the corresponding roller support 21, the corresponding rolling element 11 is positioned in the center portion 19a of the control surface 19.

Figure 2:
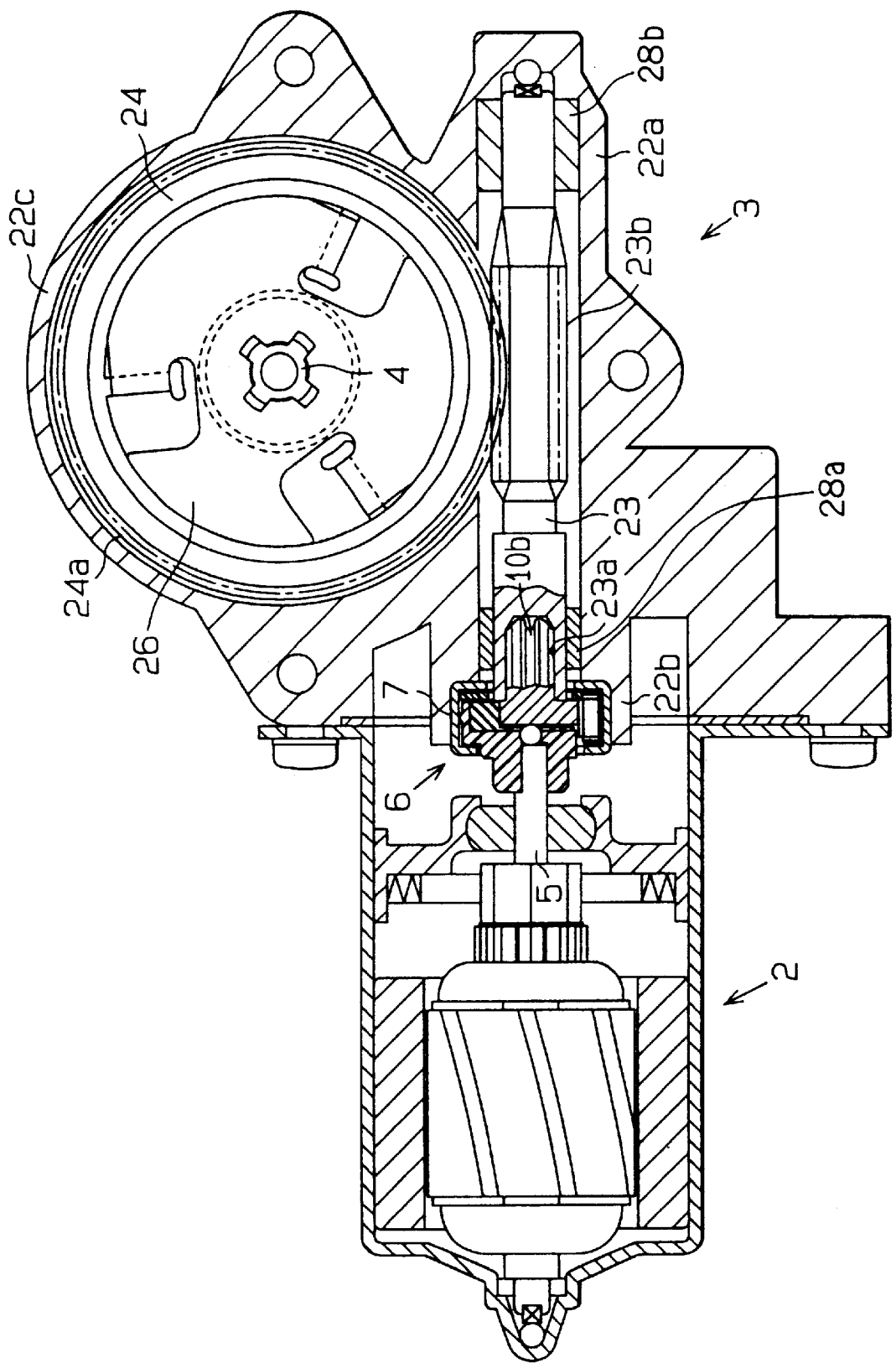
FIG. 2 is a schematic plan cross-sectional view of the motor shown in FIG. 1.

As shown in FIG. 2, a worm housing 22a of the output unit 3 has a cylindrical protrusion 22b at its base side (the left side of FIG. 2). An inner diameter of the cylindrical protrusion 22b corresponds to an outer diameter of the clutch housing 7 of the clutch 6. The clutch housing 7 is securely inserted into the cylindrical protrusion 22b.

A worm shaft 23 is rotatably supported by bearings 28a, 28b held by the worm housing 22a. At the base side (the left side of FIGS. 2 and 4) of the worm shaft 23, there is formed a coupling hole 23a corresponding to the coupling body 10b of the driven-side rotator 10. The coupling body 10b is inserted within and securely coupled to the coupling hole 23a to integrally rotate therewith.

A worm 23b of the worm shaft 23 is meshed with a worm wheel 24a of a rotatable coupler 24 that is rotatably supported within a wheel housing 22c of the output unit 3. The rotatable coupler 24 is connected to an output plate 26 via a motor protective rubber 25. A base end of the output shaft 4 is non-rotatably secured to the output plate 26. Thus, when the worm shaft 23 is rotated, the rotational force of the worm shaft 23 is transmitted to the output shaft 4 via the rotatable coupler 24, the motor protective rubber 25 and the output plate 26 to rotate the output shaft 4. A plate cover 27 is secured to an opening of the wheel housing 22c.

The power window system (clutch 6) having the above construction operates as follows.

When the motor 2 is driven to rotate the rotatable shaft 5 in the counter-clockwise direction (the direction of the arrow X) of FIG. 5, the driving-side rotator 8 is rotated integrally with the rotatable shaft 5 in the same direction (the direction of the arrow X). Then, as shown in FIG. 8, when the one side surface 13b of each protrusion 13 engages the first engaging surface 18b of the corresponding engaging projection 18, and the first side surface 17a of each opening 17 engages the corresponding roller support 21, the corresponding rolling element 11 is positioned in the center portion 19a of the corresponding control surface 19. This position is defined as a neutral position.

Prior to the engagement of the one side surface 13b of the protrusion 13 with the first engaging surface 18b, the one side surface 14d of the corresponding cushion segment 14b engages the first cushion surface 18a of the corresponding engaging projection 18 to reduce the shocks generated by the engagement.

At the neutral position, the rolling element 11 is not clamped between the control surface 19 of the engaging projection 18 and the inner circumferential surface 7d of the outer ring 7a, so that the driven-side rotator 10 having the engaging projections 18 is allowed to rotate relative to the clutch housing 7 (FIG. 6). Thus, when the driving-side rotator 8 is further rotated in the counter-clockwise direction, the rotational force of the driving-side rotator 8 is transmitted to the driven-side rotator 10 via the protrusions 13, so that the driven-side rotator 10 is rotated along with the driving-side rotator 8. During this time, the rotational force is transmitted to each rolling element 11 from the first side surface 17a of the corresponding opening 17 in the same direction (the direction of the arrow X), so that the rolling element 11 moves in the same direction.

When the rotatable shaft 5 is rotated in the clockwise direction (the direction of the arrow Y) of FIG. 5, each rolling element 11 is positioned in the neutral position by the protrusion 13, as shown in FIG. 9. At this position, the rolling element 11 is not clamped between the control surface 19 of the engaging projection 18 and the inner circumferential surface 7d of the outer ring 7a, so that the driven-side rotator 10 having the engaging projections 18 is allowed to rotate relative to the clutch housing 7. Thus, the rotational force of the driving-side rotator 8 is transmitted to the driven-side rotator 10 through the protrusions 13, so that the driven-side rotator 10 is rotated along with the driving-side rotator 8.

Thus, when the driven-side rotator 10 is rotated, the worm shaft 23, the rotatable coupler 24, the motor protective rubber 25, the output plate 26 and the output shaft 4 are rotated, so that the output shaft 4 drives the regulator R to open or close the window glass W.

While the motor 1 is not driven, a load applied to the window glass W acts on the driven-side rotator 10 to rotate the same. When the driven-side rotator 10 is rotated in the clockwise direction (the direction of the arrow Y) of FIG. 5, each rolling element 11 is moved toward the end portion 19b of the control surface 19 of the engaging projection 18. Then, as shown in FIG. 10, the rolling element 11 is clamped between the control surface 19 and the inner circumferential surface 7d of the outer ring 7a.

If the driven-side rotator 10 further rotates in the same direction, the rolling element 11 slidingly engages the inner circumferential surface 7d of the outer ring 7a and thereby generates the desired frictional force due to the above shape of the control surface 19. Thus, the rotation of the driven-side rotator 10 becomes difficult. As a result, in the motor 1 having the above type of clutch 6, the output shaft 4 is prevented from rotation due to the loss of the driving force, for example, at the clutch 6, the respective sliding parts (e.g., meshed gear portions or bearing portions) of the motor 1 or the like.

Figure 11:
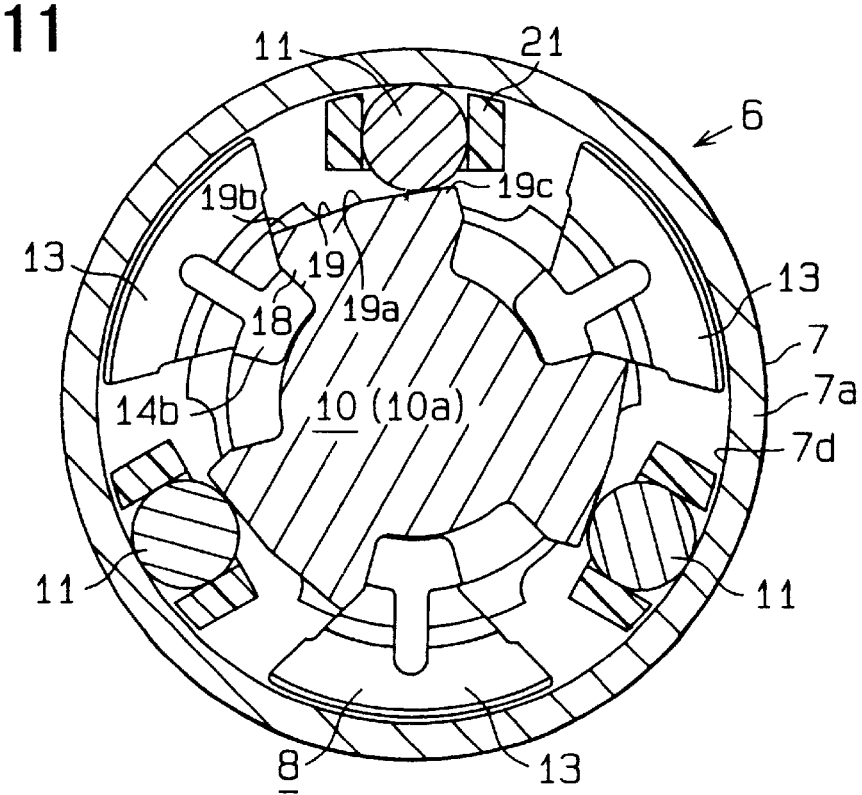
FIG. 11 is another schematic cross-sectional view of the clutch according to the present embodiment.

When the driven-side rotator 10 is rotated in the counter-clockwise direction (the direction of the arrow X) of FIG. 5, while the driving-side rotator 8 is stopped, each rolling element 11 is moved toward the end portion 19c of the control surface 19 of the engaging projection 18. Then, as shown in FIG. 11, the rolling element 11 is clamped between the control surface 19 and the inner circumferential surface 7d of the outer ring 7a.

If the driven-side rotator 10 further rotates in the same direction, similar to the above case, the rotation of the driven-side rotator 10 becomes difficult due to the desired frictional force generated upon engagement of the rolling element 11 with the inner circumferential surface 7d of the outer ring 7a. As a result, the rotation of the output shaft 4 of the motor 1 is prevented.

As described above, even if a large load is applied to the window glass W, the window glass W is not opened by such a load since the rotation of the output shaft 4 of the motor 1 is prevented.

Characteristic advantages of the above embodiment will be described below.

(1) The clutch 6 is constructed such that when the driven-side rotator 10 is rotated by the load, each rolling element 11 is positioned to be clamped between the driven-side rotator 10 and the inner circumferential surface 7d of the outer ring 7a. At the same time, the rotation of the driven-side rotator 10 is allowed while generating the frictional force between the rolling element 11 and the inner circumferential surface 7d of the outer ring 7a. As a result, instead of completely preventing the transmission of the rotational force of the driven-side rotator 10 to the driving-side rotator 8 by the clutch 6 alone, the driven-side rotator 10 is made difficult to rotate. Thus, there is no need to manufacture each component of the clutch 6 at a high degree of accuracy. As a result, the costs of the clutch 6 can be reduced.

(2) The clutch 6 can be easily designed since it is only required to make the shape of the control surface 19 of the driven-side rotator 10 to operate in the above manner.

(3) Each cushion segment 14b of the cushion member 14 reduces the shocks resulting from engagement of the one side surface 13b to the first engaging surface 18b.

(4) The positional relationship among the rolling elements 11 is maintained by the support member 12. Rattling of each rolling element 11 can be effectively prevented by the support member 12, and thereby the vibrations and noises induced by the rattling of the rolling element 11 can be prevented.

(5) The clutch 6 is arranged between the rotatable shaft 5 of the motor main body 2 and the worm shaft 23. That is, the clutch 6 is arranged at the position where a relatively small torque is applied. Thus, a strength required for the clutch 6 can be reduced. As a result, a size of the clutch 6 can be reduced, allowing reduction of the costs.

The above embodiment can be modified as follows.

(a) The control surface 19 can have any other appropriate shape. For instance, the control surface 19 can be arcuately bulged in a radially outward direction.

Similar to the control surface 19 of the above embodiment, the control surface only needs to have a shape that allows the rolling element 11 to be positioned in place where the rolling element 11 is clamped between the driven-side rotator 10 and the inner circumferential surface 7d of the outer ring 7a in a manner that allows rotation of the driven-side rotator 10 while generating a desired frictional force between the rolling element 11 and the inner circumferential surface 7d of the outer ring 7a when the driven-side rotator 10 is rotated by the load. For instance, if the control surface is arcuate, a radius of curvature of the control surface should be such that although it is not depicted, similar to FIG. 7, an angle θ between the tangent line A at the contact point P between the control surface and the rolling element 11 and the tangent line B at the contact point Q between the rolling element 11 and the inner circumferential surface 7d of the outer ring 7a falls within a desired range (5 to 20 degrees).

Figure 13:
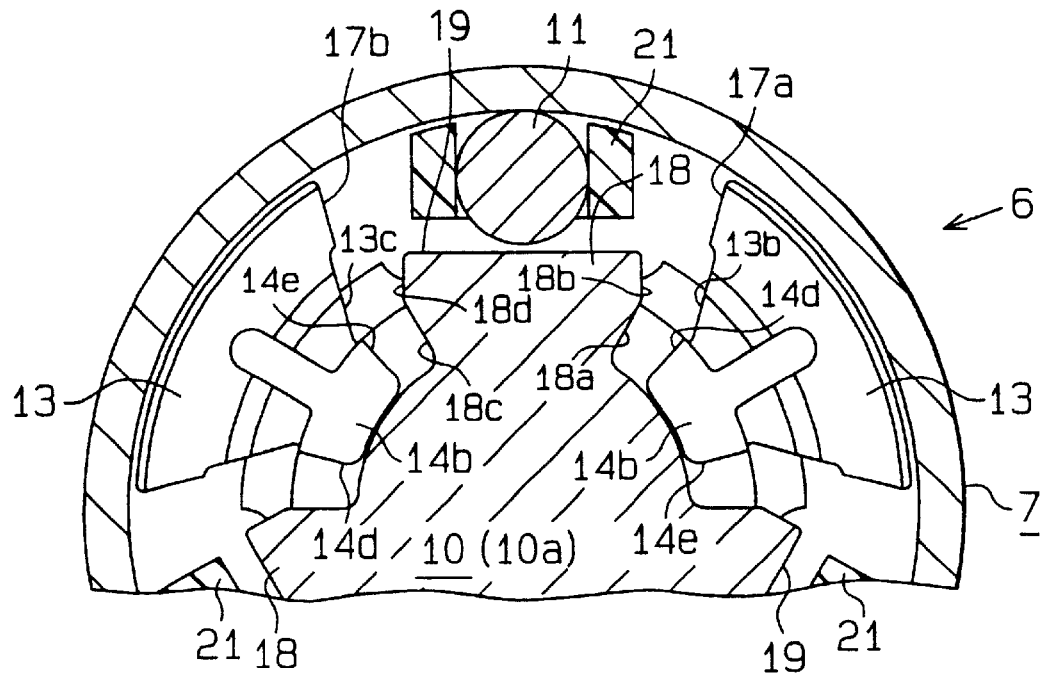
FIG. 13 is a partial cross-sectional view illustrating a modification of the clutch.

Furthermore, as shown in FIG. 13, the control surface 19 can be made as a single flat surface. Although it is not depicted, similar to FIG. 7, the control surface should be designed such that an angle θ between the tangent line A at the contact point P between the control surface 19 and the rolling element 11 and the tangent line B at the contact point Q between the rolling element 11 and the inner circumferential surface 7d of the outer ring 7a falls within a desired range (5 to 20 degrees). In this way, the control surface 19 can be made as the single flat surface, so that the control surface 19 can be manufactured more easily.

Figure 14:
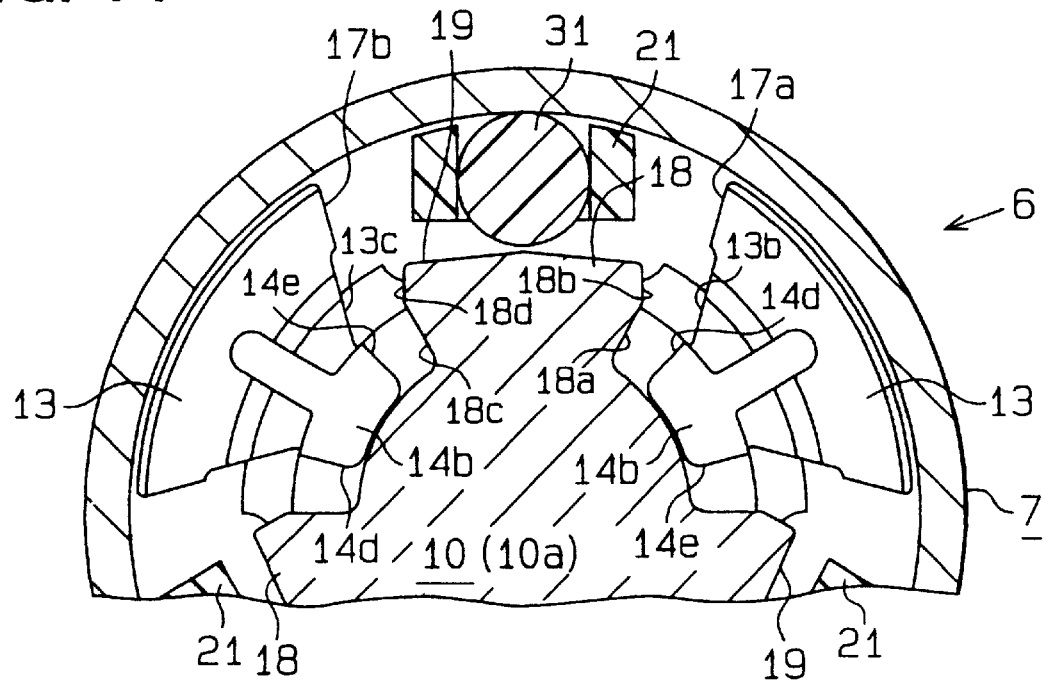
FIG. 14 is another partial cross-sectional view illustrating another modification of the clutch.

(b) The material of each rolling element 11 is not limited to the metal. For instance, as shown in FIG. 14, rolling elements 31 made of resin material can be used in place of the rolling elements 11. In this way, each rolling element 31 made of the resin material can reduce impact noise that is generated when the rolling element 31 hits other member, so that noises generated from the clutch 6 and therefore from the motor 1 can be reduced.

(c) The shape of each rolling element 11 is not limited to this. For instance, a spherical element can be used. Also, a clampable element having non-circular cross-section, i.e., the non-rotatable clampable element can be used in place of the rolling element 11.

(d) The shape and position of the cushion member 14 are not limited to those shown in FIGS. 3 and 5 as long as the collision shocks between the driving-side rotator 8 and the driven-side rotator 10 can be reduced. Alternatively, the cushion member 14 can be omitted.

(e) The shape of the support member 12 is not limited to this. Alternatively, the support member 12 can be omitted.

(f) The number of the engaging slots 15 and the number of the engaging projections 18 need only be equal to or greater than the number of the rolling elements 11. Furthermore, the shape of the support member 12 should be modified to coincide with the number of the rolling elements 11.

(g) The clutch 6 can be placed at any other suitable position. For instance, the clutch 6 can be arranged between the rotatable coupler 24 and the output shaft 4.

(h) The clutch 6 can be provided in a motor of any apparatus or system other than the power window system. Alternatively, the clutch 6 can be provided in any device other than the motor.

Additional advantages and modifications will readily occur to those skilled in the art. The invention in its broader terms is therefore, not limited to the specific details, representative apparatus, and illustrative examples shown and described.

What is claimed is:

1. A clutch comprising:
   a housing that is non-rotatably secured and has an inner circumferential surface;
   a driving-side rotator that is connected to a drive source and is rotatably received within said housing;
   a driven-side rotator that is connected to a load and is rotatably received within said housing, wherein said driven-side rotator is connected to said driving-side rotator in a manner allowing relative rotation of said driven-side rotator within a predetermined range in a rotational direction; and
   clampable means that is arranged between said driven-side rotator and said inner circumferential surface of said housing and is positionable between a clamped position where said clampable means is clamped between said driven-side rotator and said inner circumferential surface of said housing and a non-clamped position where said clampable means is not clamped between said driven-side rotator and said inner circumferential surface of said housing,
   said clutch being characterized in that:
   when said driving-side rotator is rotated by a rotational force transmitted from said drive source, rotation of said driving-side rotator causes said clampable means to be positioned in said non-clamped position and also to be revolved therewith, and at the same time said driving-side rotator engages said driven-side rotator in a rotational direction and transmits a rotational force of said driving-side rotator to said driven-side rotator; and
   when said driven-side rotator is rotated by a rotational force transmitted from said load, said clampable means is positioned in said clamped position, and at the same time said driven-side rotator is allowed to rotate while generating a desired frictional force between said clampable means and said inner circumferential surface of said housing.

2. A clutch according to claim 1, further characterized in that said clampable means includes a plurality of clampable elements provided around a rotational axis of said driving-side rotator, wherein each of said clampable elements is positioned in said clamped position when said driven-side rotator is rotated in either a first or second rotational direction.

3. A clutch according to claim 2, characterized in that said driven-side rotator includes a plurality of control surfaces arranged in a one to one relationship with said clampable elements, wherein each of said clampable elements is to be clamped between a corresponding one of said control surfaces and said inner circumferential surface of said housing.

4. A clutch comprising:

a housing that is non-rotatably secured and has an inner circumferential surface;

a driving-side rotator that is connected to a drive source and is rotatably received within said housing, wherein said driving-side rotator includes a first engaging portion;

a driven-side rotator that is connected to a load and is rotatably received within said housing, wherein said driven-side rotator includes a second engaging portion, which engages said first engaging portion in a rotational direction to limit relative rotation of said driving-side rotator within a predetermined range and which has a control surface opposing said inner circumferential surface of said housing; and a clampable element that is arranged between said inner circumferential surface of said housing and said control surface and that has an outer size smaller than a distance between a circumferential center portion of said control surface and said inner circumferential surface of said housing but larger than a distance between each of opposing circumferential end portions of said control surface and said inner circumferential surface of said housing, said clutch being characterized in that:

when said driving-side rotator is rotated by a rotational force transmitted from said drive source, rotation of said driving-side rotator causes said clampable element to be substantially positioned at said center portion and also to be revolved therewith, and at the same time said first engaging portion engages said second engaging portion in a rotational direction to transmit a rotational force of said driving-side rotator to said driven-side rotator; and when said driven-side rotator is rotated by a rotational force transmitted from said load, said clampable element is clamped between said control surface and said inner circumferential surface of said housing, and at the same time said driven-side rotator is allowed to rotate while generating a desired frictional force between said clampable element and said inner circumferential surface of said housing.

5. A clutch according to claim 4, characterized in that said control surface is formed as a single flat surface.

6. A clutch according to claim 4, characterized in that said clampable element is made of resin material.

7. A clutch according to claim 4, characterized in that an angle between a first tangent line at a contact point between said control surface and said clampable means and a second tangent line at a contact point between said rolling element and said inner circumferential surface of said housing is in a range of 5 to 20 degrees when said rolling element is clamped between said control surface and said inner circumferential surface of said housing.

8. A clutch according to claim 6, characterized in that an angle between a first tangent line at a contact point between said control surface and said clampable means and a second tangent line at a contact point between said rolling element and said inner circumferential surface of said housing is in a range of 10 to 20 degrees when said rolling element is clamped between said control surface and said inner circumferential surface of said housing.

9. A clutch according to claim 4, characterized in that said rolling element makes line contact with said inner circumferential surface of said housing and also with said control surface when said rolling element is clamped between said control surface and said inner circumferential surface of said housing.

10. A motor having a clutch according to claim 4.

11. A motor comprising:

a clutch including a driving-side rotator and a driven-side rotator that is engageable with said driving-side rotator, wherein rotation of said driving-side rotator is transmitted to said driven-side rotator when said driving-side rotator is rotated, and wherein said driven-side rotator is allowed to rotate while exerting a desired rotational load on said driving-side rotator when said driven-side rotator is rotated;

a motor main body having a rotatable shaft connected to said driving-side rotator;

an output unit including a worm shaft connected to said driven-side rotator, a worm wheel meshed with said worm shaft, and an output shaft drivably connected to said worm wheel, wherein a rotational force of said rotatable shaft is transmitted to said output shaft through said clutch, said worm shaft and said worm wheel, and transmission of a rotational force of said output shaft to said rotatable shaft is prevented at least by a meshing load between said worm wheel and said worm shaft as well as by a rotational load of said clutch.

12. A motor comprising:

a clutch including a driving-side rotator and a driven-side rotator that is engageable with said driving-side rotator, wherein rotation of said driving-side rotator is transmitted to said driven-side rotator when said driving-side rotator is rotated, and wherein said driven-side rotator is allowed to rotate while exerting a desired rotational load on said driving-side rotator when said driven-side rotator is rotated;

a motor main body having a rotatable shaft connected to said driving-side rotator; and an output unit including a worm shaft connected to said driven-side rotator and rotatably supported by bearings, a worm wheel meshed with said worm shaft, and an output shaft drivably connected to said worm wheel, wherein a rotational force of said rotatable shaft is transmitted to said output shaft through said clutch, said worm shaft and said worm wheel, and wherein transmission of a rotational force of said output shaft to said rotatable shaft is prevented at least by a meshing load between said worm wheel and said worm shaft, by a frictional load between said worm shaft and said bearings and by a rotational load of said clutch.

* * * * *